July 17, 1956  C. DUFOUR  2,755,409
CATHODE-RAY OSCILLOSCOPES

Filed March 4, 1955 2 Sheets-Sheet 1

INVENTOR
CHARLES DUFOUR

Paul M. Craig Jr.

ATTORNEY

July 17, 1956

C. DUFOUR 2,755,409

CATHODE-RAY OSCILLOSCOPES

Filed March 4, 1955

INVENTOR
CHARLES DUFOUR

Paul M. Craig, Jr.

ATTORNEY

United States Patent Office 2,755,409
Patented July 17, 1956

2,755,409

CATHODE-RAY OSCILLOSCOPES

Charles Dufour, Paris, France, assignor to Compagnie Generale de Telegraphie Sans Fil, a corporation of France Application March 4, 1955, Serial No. 492,151

Claims priority, application France March 10, 1954

8 Claims. (Cl. 315—12)

The present invention relates to cathode-ray oscilloscopes, and more particularly to such oscilloscopes wherein information which is received in the form of a difference of phase between two series of pulses having the same frequency of recurrence is transformed into luminous spots the positions of which vary on the oscilloscope screen.

Such oscilloscopes are currently used in radar systems. The co-ordinates of a luminous spot appearing on the screen give the distance from the radar receiver to the object to which the spot corresponds.

These apparatus often have the defect that the spot is less visible as the object is more distant.

The invention has for its main object to provide a cathode-ray oscilloscope which is to a large extent exempt from this defect.

A further object of the invention is to provide an oscilloscope having an improved luminosity.

Accordingly, the cathode-ray oscilloscope of the invention comprises:

(a) Means for forming a flat laminar beam which permanently illuminates the screen of the tube along a line or trace disposed substantially diametrally on the screen.

(b) A plurality of thin metal parallel wire-shaped electrodes, insulated from each other and contained over at least a portion of their length in a plane parallel to the laminar beam.

(c) An electrode extending at least partly in a plane parallel to said laminar beam and defining, with said thin wire-shaped electrodes a space through which the electrons of said laminar beam pass.

(d) Means permitting the information received to be transformed into an electric charge and to be applied to one of said thin electrodes, the data then appearing on the screen of the oscilloscope in the form of a local deflection of the trace on the screen of the laminar beam.

Other objects of the invention will appear from the ensuing description, which is given solely by way of example, with reference to the accompanying drawings in which.

Figure 1:
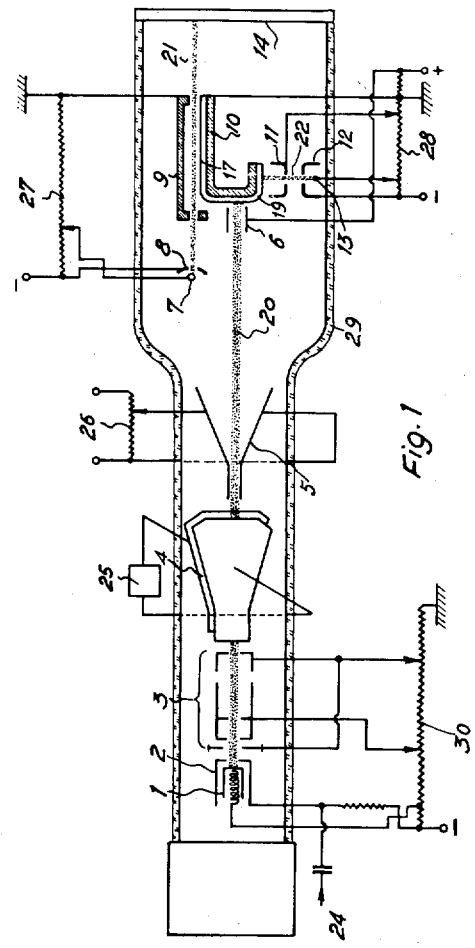
Fig. 1 is a longitudinal sectional view of one form of cathode-ray oscilloscope embodying the invention.

Fig. 1 shows a vacuum-tight glass envelope 29 which has an axis of revolution and is closed at one end by a screen 14 which is perpendicular to the axis of the tube and is covered with a fluorescent substance in the known manner. At the other end of the envelope, an electron gun is so disposed as to emit a thin electron beam 20. This gun comprises: a cathode 1, a control electrode 2, accelerating and focusing electrodes 3, two horizontal deflecting plates 4 connected to a time base device 25 and two vertical deflecting plates 5 connected to an adjustable source of direct current voltage 26.

According to the invention, the tube further comprises:

A linear cathode 7 perpendicular to the plane of the figure, and a control electrode 8 having a linear slit parallel to the cathode 7. These two electrodes produce a flat laminar beam 21 situated in a plane perpendicular to that of the figure and parallel to the axis of the tube. Two electrodes 9 and 10, parallel to the plane of the laminar beam, extend alongside the latter on either side thereof. The electrode 9 is a metal plate having, at its end adjacent the cathode 7, a base 91 and a slot 92 parallel to the cathode 7, and acts as an accelerating electrode for the beam 21.

Figure 3:
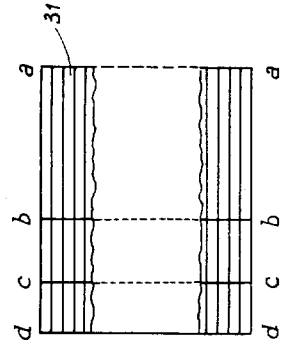
Figure 2:
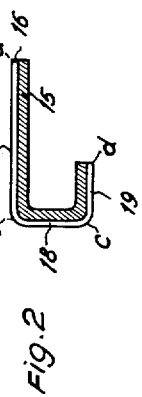
Fig. 2 is a sectional view, and Fig. 3, a developed plan view of an essential element of the tube shown in Fig. 1.

The electrode 10 comprises, as shown in Fig. 2, a metal plate 15 which has two right-angle bands so as to define three sides: two sides 17 and 19 parallel to the plane of the beam 21, and one side 18 perpendicular to the other sides. The surface of this metal plate is covered with an insulating layer 16 having a thickness of the order of $20\mu$. Disposed on the surface of the layer 16, for example by metal deposit, are linear strips 31 shown in Fig. 3 which are some tenth of millimeters wide and are disposed very close to one another but electrically insulated. Their length is equal to the perimeter $a, b, c, d$ of Fig. 3, each of these electrodes being contained in a plane parallel to the plane of the Figs. 1 and 2. The development of the electrode 10 illustrated in Fig. 3 shows the respective positions of the strips 31.

A second linear cathode 13, perpendicular to the plane of the figure, and a control electrode 12, having a linear slit 121 parallel to the cathode 13, produce a second laminar beam 22 situated in a plane perpendicular to the axis of the tube. The electrodes 6 and 11 serve to collect secondary electrons.

Potentiometers 26, 27, 28 and 30 connected respectively to sources of voltage permit the required voltage to be obtained for each element of the tube. The electrode 9 and the metal plate 15 of the electrode 10 are grounded. The cathodes 7 and 11 have negative potentials of the order of 1,000 volts. The control electrodes 8 and 12 are at negative potentials relative to those of their respective cathodes 7 and 13, these potentials being just sufficiently negative to focus the laminar beams 21 and 22. The control electrode 2 is at a sufficiently negative potential relative to the cathode 1, for normally blocking the electronic emission of the cathode 1. A connection 24 puts the control electrode 2 in communication with the positive pulses derived from the information.

The horizontal deflecting electrodes 4 are connected to a time base device 25, known per se, which delivers a saw-tooth voltage. The sole function of the vertical deflection electrodes 5 is to center the spot on the screen. They are connected to the potentiometer 26.

The cathode 7, the slit of the control electrode 8, the cathode 13, its control electrode 12, the collector electrode 6 and 11, and the metal plate 9 all have a same length approximately equal to the dimension $a$—$a$ (Fig. 3) of the electrode 10.

The above-described device operates in the following manner:

The laminar beam 21 traverses the spaces between the electrodes 9 and 10 in a direction parallel to the latter and to the strips 31. Each insulated strip 31, associated with a portion of the metal plate 9 facing it, constitutes a capacitor which, when sufficient difference of potential is established between its electrodes, deflects the paths of the electrons of the beam 21 passing between its armatures.

As has been seen above, the difference of potential which normally prevails between the control electrode 2 and the cathode 1 is sufficiently high to block the emission from this cathode. Each time a positive pulse is applied, by means of the connection 24, to the control electrode 2, the negative potential of the latter diminishes in absolute value. If the intensity of the pulses is sufficient, the cathode is unblocked and it emits the beam 20 for the duration of the pulse. The beam 20 then strikes one or more strips 31, according to its width. This width is preferably adjusted in such a manner that only a single strip is bombarded. The position of this strip obviously depends on the instantaneous difference of potential prevailing between the deflecting plates 4, upon passage of the beam 20.

As the electrode 10 is grounded before passage of the beam, all the electrodes 31 are also at the ground potential. Thus there is a difference of potential of the order of 1,000 volts between the cathode 1 and the strips 31 before any bombardment. On striking a strip 31, the electrons of the beam 20, therefore, give rise to a substantial secondary emission; i. e. a single electron of the beam 20, or primary electron, gives rise to a large number of secondary electrons. As the strip 31 loses in the course of the bombardment more negative charges than it receives, it becomes positively charged. As the electrode 6 is brought to a positive potential of the order of 50 volts, relative to ground, by means of the potentiometer 28, the secondary electrons emitted by the strip 31 return to this strip so long as the potential of the strip is less than 50 volts. It is well known that as soon as this potential of 50 volts is attained by the strip 31, this potential will be for the latter a stable equilibrium potential which it will not exceed.

If the pulses arriving through the connection 24 are synchronized with the sweep of the beam 20 (which is the case in, for example, radar) at each passage of the beam the same strip 31 will receive a certain number of positive charges, so long as the pulses keep the same phase. In other words, in the case of radar, so long as the pulses correspond to the same object, fixed relative to the radar, the same strip 31 will be struck by the beam 20.

Figure 5:
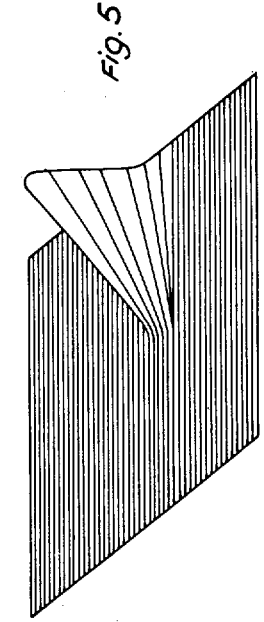
Fig. 5 shows the form of the laminar beam at the instant of the recording of an information.
Figure 4:
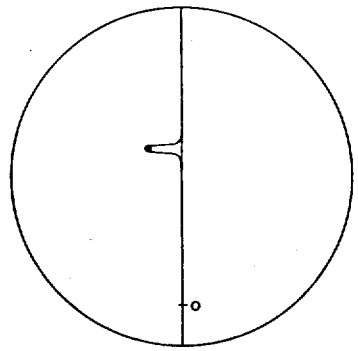
Fig. 4 shows the indication obtained on the screen of the oscilloscope embodying the invention.

In this way, advantage is taken of the integrating properties of the deflecting capacitors. The strip 31 in question adds up the charges communicated to it by the beam 20 for each new impact of the latter thereon. The difference of potential between the strip 31 and the electrode 9 increases sufficiently to permit the deflection of the electron paths of the laminar beam 20 which are the nearest to the strip 31 in question. The laminar beam assumes the form shown in Fig. 5 and the image recorded on the screen of the oscilloscope is in accordance with that shown in Fig. 4.

The information is manifested by a bright spot on the screen. However, provision should be made for the evacuation of the charges from the strip which has been bombarded, so as to regulate the apparent "remanence" of the tube. To this end, the laminar beam of electrons 22, produced by the system of electrodes 13—12, bombards the electrode 10 on the part of the individual strips situated on the face 19 of Fig. 2. As the electrode 11 is brought to a negative potential relative to ground by means of the potentiometer 28, it urges the secondary electrons to neutralize the positive charges in the strips 31. In this way, there is obtained an adjustable ohmic loss which permits discharging the individual capacitors. Thus the recording operation on the strips may then be recommenced, all these strips having been brought to ground potential.

This reading and erasing device may be housed inside the envelope of a conventional cathode-ray tube. The resultant additional elongation is only some centimeters.

Figure 6:
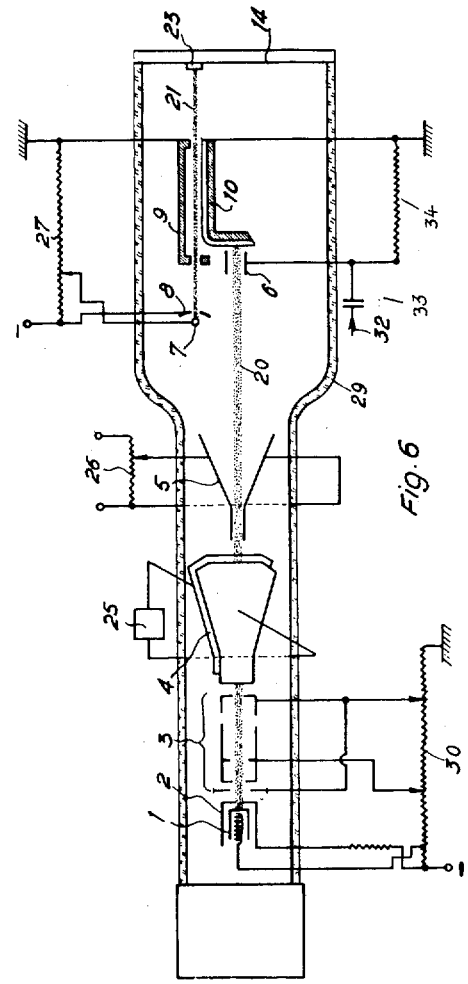
Fig. 6 is a longitudinal sectional view of another cathode-ray oscilloscope embodying the invention.

In Fig. 6, the same reference numerals designate the same elements shown in Fig. 1; further, a shield 23 masks a part of the screen of the oscilloscope normally illuminated by the laminar beam 21. Only the local deflections appear, and their brilliance is thereby increased. This arrangement permits disposing the assemblage of electrodes 9—10 a very short distance from the screen 14, the amplitude of the deflection being notably less.

Further, the connection 32 sends the pulses to the collector electrode 6, in substitution for the connection 24 to the electrode 2. The electrode 10 has only two sides, the sides 17 and 18. The erasing device of Fig. 1 is eliminated.

The electrode 6 is connected to ground by a resistance 33 and the connnection 32 supplies the positive pulses through a capacitor 34.

The device illustrated in Fig. 6 operates in the following manner:

The beam 20 operates at constant intensity and, in sweeping, reaches all the strips 31 in succession.

(a) In the absence of pulses arriving by way of the connection 32, the electrode 6 is at ground potential i. e. at the potential that the strips 31 have before the beam sweeps.

In consequence, the secondary electrons emitted by each strip 31 form an electronic current between the electrode 6 and the strips 31 and fix the potential of the latter at the ground, that is the stable equilibrium potential.

(b) When a pulse arrives at the electrode 6, the latter is brought, for the duration of this pulse, to a positive potential, i. e. that of the pulse. The strip attained by the beam at this instant is discharged at this potential if the current of the beam is sufficient. The local deflection appears.

When there are no pulses, the electrode 6 is discharged through the grounded capacitor 34 and the resistance 33, and is brought to ground potential.

The erasing device is no longer needed. Indeed, during the following sweep, if there are no pulses, the previously bombarded strip 31 resumes the potential of the electrode 6, i. e. ground potential.

The recorded spot of the tube of Fig. 6 is larger than in the case of Fig. 1. When the electrode 6 is more negative than the strips 31, it returns to the latter the secondary electrons which charge these strips.

The device according to the invention is of use in all apparatus where the information received is in the form of pulses. It is of particular interest when the information is transformed into a phase shift of a series of pulses having a fixed frequency of recurrence. In such a case, each bombarded strip 31 receives several successive charges. After a certain number of sweeps, the deflection becomes independent of the amplitude of the pulse. This is of particular interest in the radar field where distant objects are those which return the weakest echoes.

It is known, moreover, that with conventional devices the brilliance or luminosity of the spot is satisfactory only if the readings are taken in dark surroundings. The device embodying the invention permits the utilization of cathode-ray oscilloscopes under any lighting conditions. It may be advantageously utilized, on account of its increased luminosity, on board aircraft, so as to enable the navigator to ascertain the distances to the ground stations.

What I claim is:

1. A cathode-ray tube oscilloscope closed, at one end, by a planar fluorescent screen and having, at the other end, an electron gun for emitting and directing a thin electron beam, and deflecting means for causing said electron beam to sweep a first predetermined plane, said tube comprising: means for emitting and directing toward said screen, and in a second predetermined plane perpendicular to said screen, a laminar electron beam composed of a plurality of parallel paths of electrons, and means for selecting and deflecting one of said paths in a direction perpendicular to said second predetermined plane including: on a first side of said second plane, a first conductive electrode parallel to said second plane, and on the second side of said second plane, a plurality of parallel wire-shaped electrodes insulated from each other, having respectively a first portion extending in a plane parallel to said second plane, and a second portion cutting said first plane and positioned to intercept said thin electron beam.

2. A cathode-ray tube oscilloscope closed, at one end, by a planar fluorescent screen and having, at the other end, an electron gun for emitting and directing a thin electron beam, and deflecting means for causing said electron beam to sweep a first predetermined plane, said tube comprising: means for emitting and directing toward said screen, and in a second predetermined plane perpendicular to said screen, a laminar electron beam composed of a plurality of parallel paths of electrons, and means for selecting and deflecting one of said paths in a direction perpendicular to said second predetermined plane and including: on a first side of said second plane, a first conductive electrode parallel to said second predetermined plane and, on the second side of said second plane, a second conductive electrode having a first portion extending in a plane parallel to said second plane, and a second portion cutting said first plane, and positioned to intercept said thin electron beam; means for grounding said second electrode; a thin layer of insulating material deposited over the surface of said second electrode facing said electron gun; a plurality of wire-shaped electrodes deposited over said thin layer and extending respectively in planes perpendicular to said second plane; and a collector electrode near said plurality of electrodes for collecting secondary electrons resulting from the bombardment of said wire-shaped electrodes by said thin electron beam.

3. A cathode-ray tube oscilloscope as claimed in claim 2, wherein said electron gun comprises a cathode and means for bringing said cathode to a potential of about 1000 v. relatively to ground potential.

4. A cathode-ray tube oscilloscope as claimed in claim 2, wherein said collector for secondary electrons comprises two parallel plates closely spaced from said plurality of wire-shaped electrodes.

5. A cathode-ray tube oscilloscope as claimed in claim 2, wherein means are provided for masking partly said fluorescent screen whereby only the deflected portion of said laminar electron beam is visible on said screen.

6. A cathode-ray tube oscilloscope closed at one end by a planar fluorescent screen and having, at the other end, a cathode and an electron gun for directing a thin electron beam, deflecting means for causing said electron beam to sweep a first predetermined plane, and means for bringing said cathode to a potential of about 1000 v. relatively to ground potential, said tube comprising: a control electrode; a source of potential for bringing said control electrode to a negative potential relatively to said cathode, for normally blocking the emission thereof; means for feeding to said control electrode recurrent pulses of positive polarity for periodically unblocking said cathode; means for synchronizing said pulse feeding means with said thin electron deflecting means; means for emitting and directing toward said screen, and in a second predetermined plane perpendicular to said screen, a laminar electron beam composed of a plurality of parallel paths of electrons; and means for selecting and deflecting one of said paths in a direction perpendicular to said second predetermined plane including: on a first side of said second plane, a first conductive electrode parallel to said second predetermined plane and, on the second side of said second plane, a second conductive electrode having a first portion extending in a plane parallel to said second plane, and a second portion cutting said first plane and positioned to intercept said thin electron beam; means for grounding said second electrode; a thin layer of insulating material deposited over the surface of said second electrode facing said electron gun; a plurality of wire-shaped electrodes deposited over said thin layer and extending respectively in planes perpendicular to said second plane; a collector electrode near said plurality of electrodes for collecting secondary electrons resulting from the bombardment of said wire-shaped electrode by said thin electron beam; and means for bringing said collector electrode to a potential of about 50 v. relatively to ground potential.

7. A cathode-ray tube oscilloscope according to claim 6 further comprising: a third plane portion of said second conductive electrode, said third portion extending in a plane parallel to said second plane, and means for emitting and directing a second laminar electron beam in a plane perpendicular to said second plane and cutting said third portion.

8. A cathode-ray tube oscilloscope closed at one end by a planar fluorescent screen and having, at the other end, a cathode and an electron gun for directing a thin electron beam, deflecting means for said electron beam, means for applying a scanning voltage to said deflecting means for causing said electron beam to sweep a first predetermined plane, and means for bringing said cathode to a potential of about 1000 v. relatively to ground, said tube comprising: means for emitting and directing toward said screen, and in a second predetermined plane perpendicular to said screen, a laminar electron beam composed of a plurality of parallel paths of electrons, and means for selecting and deflecting one of said paths in a direction perpendicular to said second predetermined plane including: on a first side of said second plane, a first conductive electrode parallel to said second predetermined plane and, on the second side of said second plane, a second conductive electrode having a first portion extending in a plane parallel to said second plane, and a second portion cutting said first plane positioned to intercept said thin electron beam; means for grounding said second electrode; a thin layer of insulating material deposited over the surface of said second electrode facing said electron gun; a plurality of wire-shaped electrodes deposited over said thin layer and extending respectively in planes perpendicular to said second plane; a collector electrode near said plurality of electrodes for collecting secondary electrons resulting from the bombardment of said wire-shaped electrodes by said thin electron beam; a resistor connected between the collector for secondary electrons and ground; means for feeding to said collector recurrent pulses of positive polarity; and means for synchronizing said pulse feeding means with the scanning voltage applied to said thin electron beam deflecting means.

References Cited in the file of this patent
UNITED STATES PATENTS

| | | |
|---|---|---|
| 2,355,212 | Farnsworth | Aug. 8, 1944 |
| 2,416,914 | Eaton | Mar. 4, 1947 |
| 2,449,339 | Sziklai | Sept. 14, 1948 |
| 2,451,484 | Gould et al. | Oct. 19, 1948 |
| 2,459,131 | Mesner | Jan. 11, 1949 |
| 2,681,425 | Haeff | June 15, 1954 |